Oct. 27, 1942.     O. E. FISHBURN     2,299,889
REMOTE SHIFT MECHANISM
Filed July 3, 1941     4 Sheets-Sheet 1
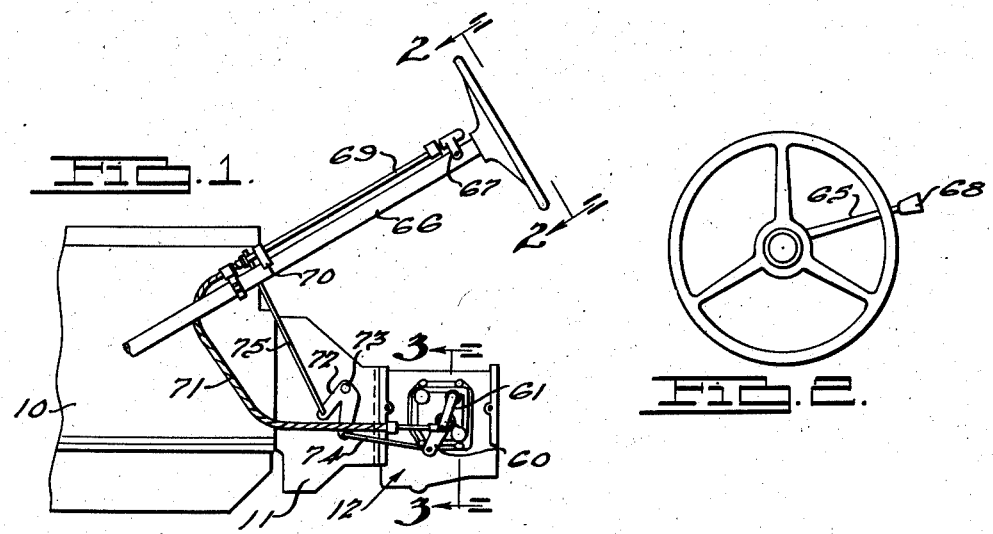
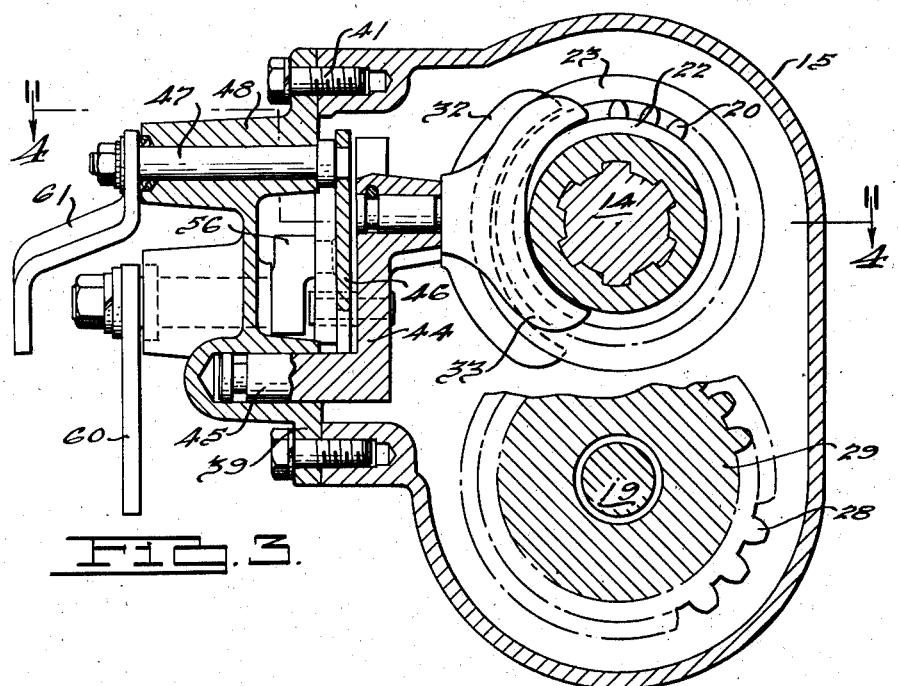
INVENTOR
Otto E. Fishburn.
BY
ATTORNEYS.

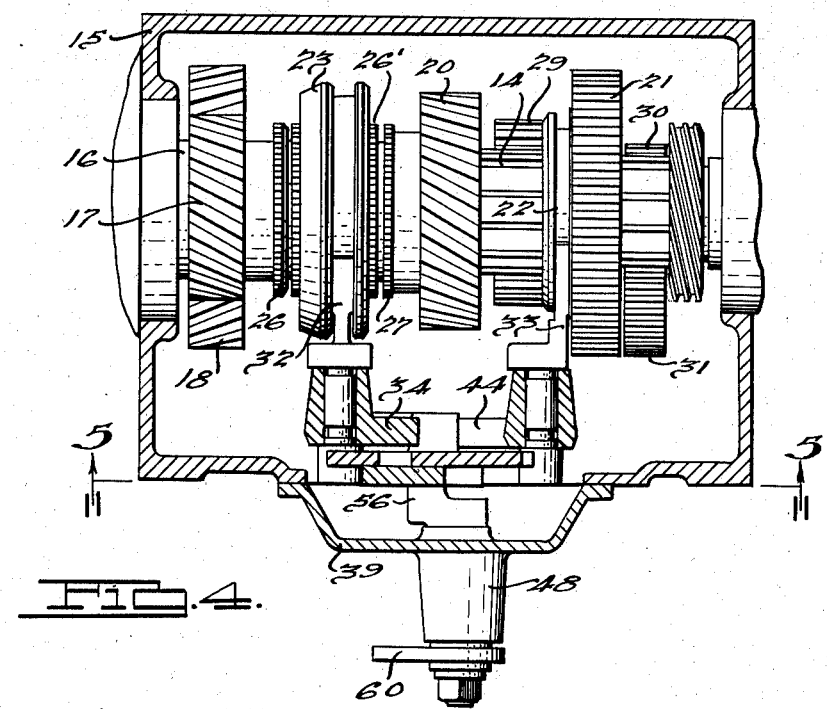
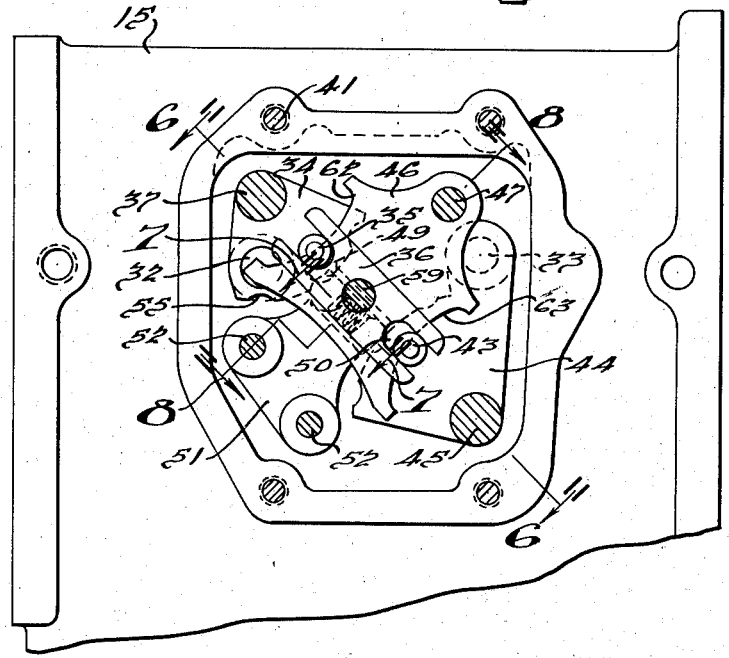

Oct. 27, 1942.  O. E. FISHBURN  2,299,889
REMOTE SHIFT MECHANISM
Filed July 3, 1941  4 Sheets-Sheet 3
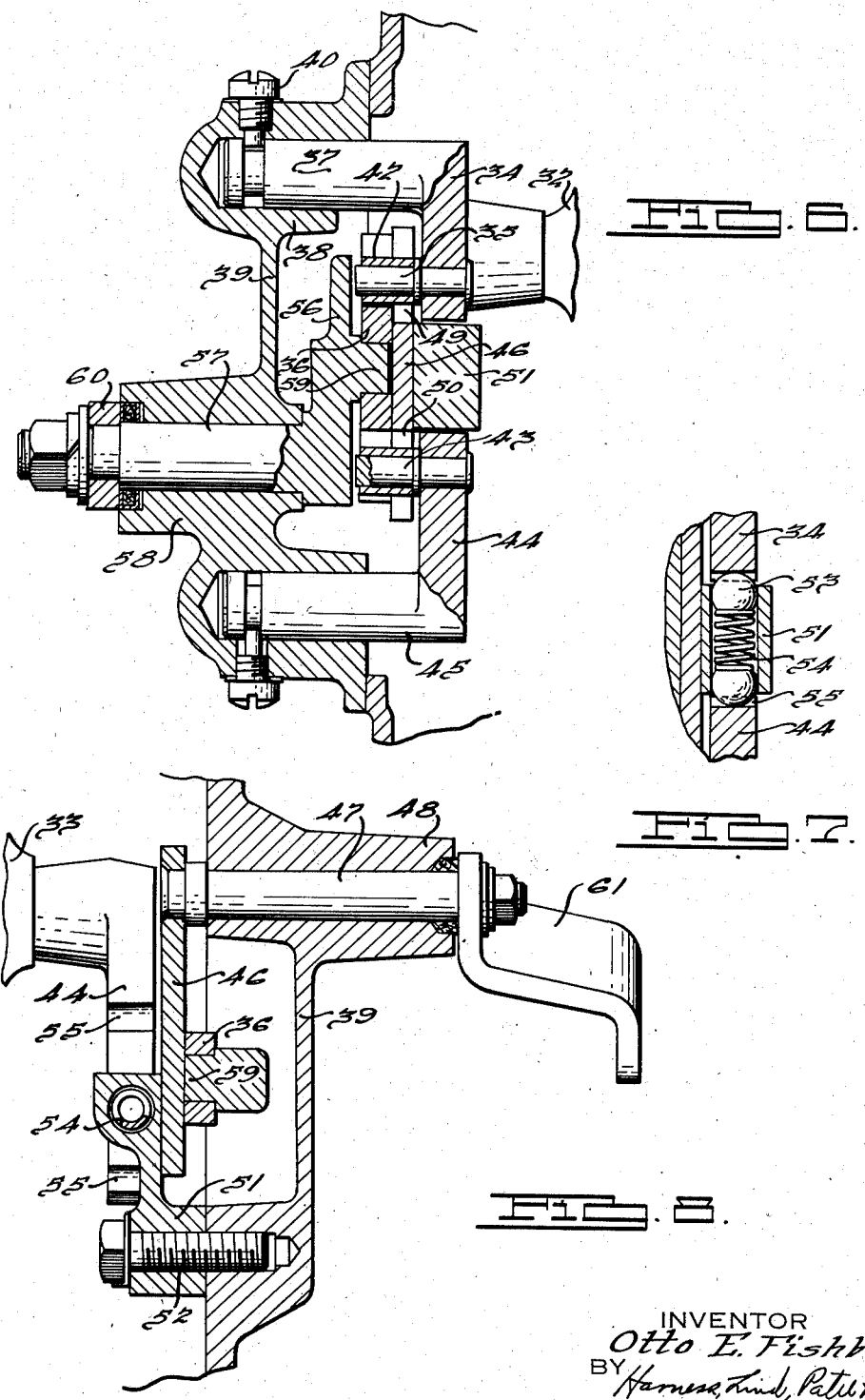
INVENTOR
Otto E. Fishburn.
BY
ATTORNEYS.

Oct. 27, 1942.   O. E. FISHBURN   2,299,889
REMOTE SHIFT MECHANISM
Filed July 3, 1941   4 Sheets-Sheet 4

INVENTOR
Otto E. Fishburn.
BY
ATTORNEYS.

Patented Oct. 27, 1942

2,299,889

UNITED STATES PATENT OFFICE 2,299,889

REMOTE SHIFT MECHANISM

Otto E. Fishburn, Detroit, Mich., assignor to Chrysler Corporation, Highland Park, Mich., a corporation of Delaware Application July 3, 1941, Serial No. 400,917

7 Claims. (Cl. 74—477)

This invention relates to improvements in variable speed transmission mechanism of the type particularly adapted for use in motor vehicles.

The principal object of the invention is to provide an improved selector and shifter mechanism for the transmission shift yokes which will be positive in action, smooth in operation and economical to manufacture.

A further object is to eliminate the necessity for shift rails and their usual interlocking and detent mechanism.

A still further object is to provide a positive interlock whereby shifting of one yoke is rendered impossible unless the other yoke is in neutral.

An additional object is to provide a shift control structure which is adapted to be carried in its entirety by the transmission case cover on the side of the transmission.

Another object is to provide an improved shift apparatus of the floating lever type.

Another object is to provide such a shift mechanism wherein all of the actuating members are pivotally movable thereby eliminating sliding friction entirely.

Further objects and advantages of the invention will be apparent from the following description taken in conjunction with the accompanying drawings, in which:

Fig. 1 is a diagrammatic, fragmentary, vertical sectional view of a motor vehicle embodying the present invention.

Fig. 2 is a plan view of the steering wheel and shift lever assembly as viewed in the direction of the arrows 2—2 in Fig. 1.

Fig. 3 is a sectional view taken along line 3—3 of Fig. 1.

Fig. 4 is a sectional view along line 4—4 of Fig. 3.

Fig. 5 is a sectional view along line 5—5 of Fig. 4.

Fig. 6 is a sectional view along line 6—6 of Fig. 5, the parts being shown in neutral position.

Fig. 7 is a detail section of the detent mechanism as indicated by line 7—7 of Fig. 5.

Fig. 8 is a sectional view along the line 8—8 of Fig. 5.

Figures 9, 10:
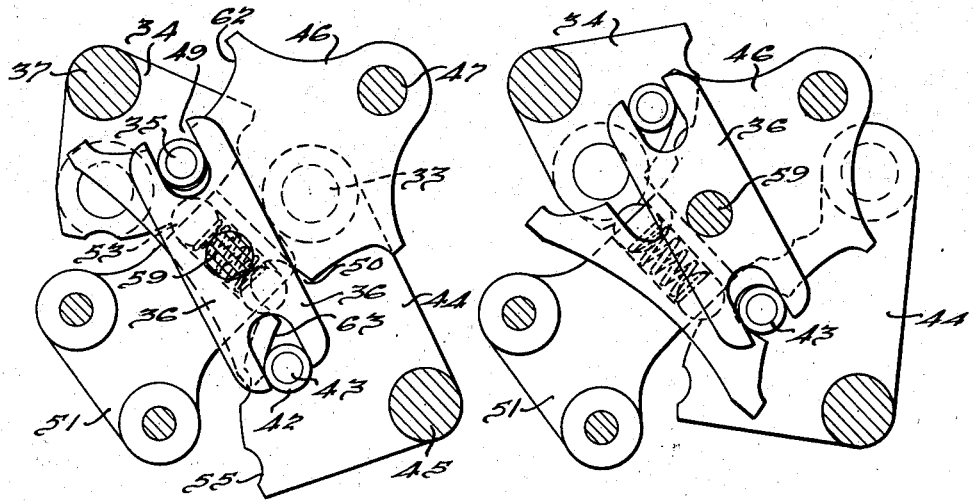

Figs. 9 to 12, inclusive, are fragmentary views of the selector and shift actuating members, the parts being shown in first, second, direct and reverse drive settings respectively.

In the drawings is illustrated an embodiment of the invention in a motor vehicle drive including a unitary power plant having an engine 10, clutch 11 and a transmission mechanism, generally designated by the numeral 12.

The transmission 12 includes a housing 15 (Fig. 4) into which extends a driving shaft 16, having a gear 17 meshed with a gear 18 fixed on a countershaft 19 which is journalled at its opposite ends in apertures in the end walls of the housing 15. The driven shaft 14 extends into the housing 15 and has a gear 20 journalled on its internal end portion. A slidable gear 21, disposed on the right side of the gear 20 and splined on the shaft 14, is provided with a shifter fork receiving collar 22. Formed on the adjacent sides of the gear 17 and 20 are hub portions which are provided with external clutch teeth 26 and 27, respectively. Splined on the shaft 14 is a hub member having teeth 26' which, in accordance with the usual practice, carry a shiftable clutch member 23 which is splined on the hub member at a location between the hub portion of the gears 17 and 20 and provided with internal clutch teeth with which the clutch teeth 27 and 26 respectively are adapted to be selectively meshed as is well known in the art. A direct drive setting of the gears may be produced by shifting the clutch member 23 to the left, as viewed in Fig. 4 to connect the clutch teeth 26 with the teeth 26'. When the clutch member 23 is shifted to the right, the teeth 27 and 26' are connected thereby holding the gear 20 against rotation relative to the shaft 16. The gear 20 is permanently meshed with a gear 28 on the countershaft 19 by which the gear 20 and shaft 14 are driven to establish a second speed drive. Low speed and reverse settings of the transmission may be established by shifting the gear 21 into mesh with a gear 29 on the countershaft 19 and with a reverse gear 31 driven by a pinion 30 on the countershaft respectively.

The clutch member 23 is provided with the usual groove for receiving the tines of a shift yoke or fork 32. A similar yoke 33 is provided for shifting the gear 21. The yoke 32 is carried by a lug 34 which in turn carries a pin 35 disposed in engagement with a floating lever 36, and an axle 37. The latter is journalled in a boss 38 formed in the cover 39, a set screw 40 (Fig. 6) being provided for securing the axle against endwise displacement. The cover 39 is detachably secured to the transmission casing by screws, 41. The pin 35 has a roller bushing 42 rotatably fastened thereon for reducing the friction incident to the sliding and pivoting of the floating lever 36. The latter is provided with bifurcated end portions which engage the pin 35 and a similar pin 43 carried by a lug 44, as shown in Fig. 5. The lug 44 carries the low-reverse yoke 33 and is in turn mounted in the cover 39 by an axle 45 in a manner identical with the lug 34.

A selector or locking lever 46 is carried by an axle shaft 47 journalled in the cover 39 through a boss 48. The lever 46 is provided with oppositely disposed arcuate surface portions 62, 63, each of which has a slot cut therein. The slot 49 is adapted to engage the pin 35 and the slot 50 is adapted to engage the pin 43 depending upon the position of the lever 46.

Fastened by cap screws 52 to the inner face of the cover 39 is a detent supporting lug 51. This lug carries a pair of balls 53 (Fig. 7) which are urged outwardly by a spring 54 into yieldable engagement with the detent receiving depressions 55 formed in each of the lugs 34 and 44. The detent balls 53 assist in retaining the yokes 32 and 33 in their respective shifted positions and in addition impart a "feel" to the operation of the mechanism which materially assists the driver.

The floating lever 36 is mounted on a crank lever 56 as illustrated in Fig. 6. The lever 56 is carried by an axle shaft 57 which is journalled in a boss 58 formed in the cover 39 and has an integral pivot 59 on which the lever 36 is carried. The shift axle 57 is actuated by a shift lever 60 and the selector axle 47 is actuated by a lever 61 (see Figs. 3, 6 and 8).

Apparatus for manually actuating the levers 60 and 61 may be mounted at any location in the driver's compartment of the vehicle within convenient reach of the driver. Any suitable apparatus may be used, that being shown in Figs. 1 and 2 preferably being employed, although any suitable apparatus such as that shown in the copending application of Frederic W. Slack, Serial No. 293,657, filed in the United States Patent Office on September 7, 1939 may be employed.

In Figs. 1 and 2, the manual control apparatus comprises a gear shift lever 65 which is carried on the steering column 66 of the vehicle by means of a bracket 67. The manual control lever is preferably of stamped construction and has a knob 68 on its outer end. The inner end of the aforesaid lever is pivotally mounted on the steering column 66 and is operatively connected with a rod 69 which is carried on the steering column 66 in parallel relation thereto by means of the bracket 67 and a bracket 70 carried by the lower portion of the steering column. Suitable mechanism is provided such that rocking of the lever 65 in a direction generally parallel with the axis of the steering column 66 will cause the rod 69 to be reciprocated axially of the steering column. A Bowden cable assembly 71 operatively connects the selector lever 61 with the rod 69 and is adapted to transmit motion between the rod 69 and the lever 61. A bellcrank lever 72 is pivotally mounted on the clutch housing 11 at 73 and has an arm connected with the transmission shift lever 60 by means of a link 74 and a second arm connected with the rod 69 by a link 75. The arrangement is such that rocking of the rod 69 about its longitudinal axis will cause a corresponding rocking motion of the bellcrank 72 and the transmission shift lever 60.

It will now be apparent from the description that swinging of the lever 61 will cause a corresponding swinging of the inside locking or selector lever 46. Fig. 5 shows the parts in neutral, the lever 46 being in a central position with the locking slots 49 and 50 partially engaging the pins 35 and 43 respectively. Under these conditions, swinging of the shift levers 56 and 60 is prevented.

Fig. 9 illustrates the parts after the transmission has been manipulated in first or low speed ratio drive. It will be seen that lever 46 has been swung clockwise about its axle 47 as far as permitted by engagement of the pin 35 in slot 49 which is sufficient to free the pin 43 from slot 50, the rollers 42 on the pin then being adapted to roll on the arcuate surface 63 of the lever 46 in either direction in accordance with the direction of swing of the lever 36. The latter is of course shiftable by the crank 56. In Fig. 9, the crank 56 has been swung counterclockwise about the axle 57 which has caused the lever 36 to be swung clockwise about the pin 35, and the lug 44 to be swung counterclockwise about its axle 45 to thereby slide gear 21 into mesh with gear 29.

Figures 11, 12:
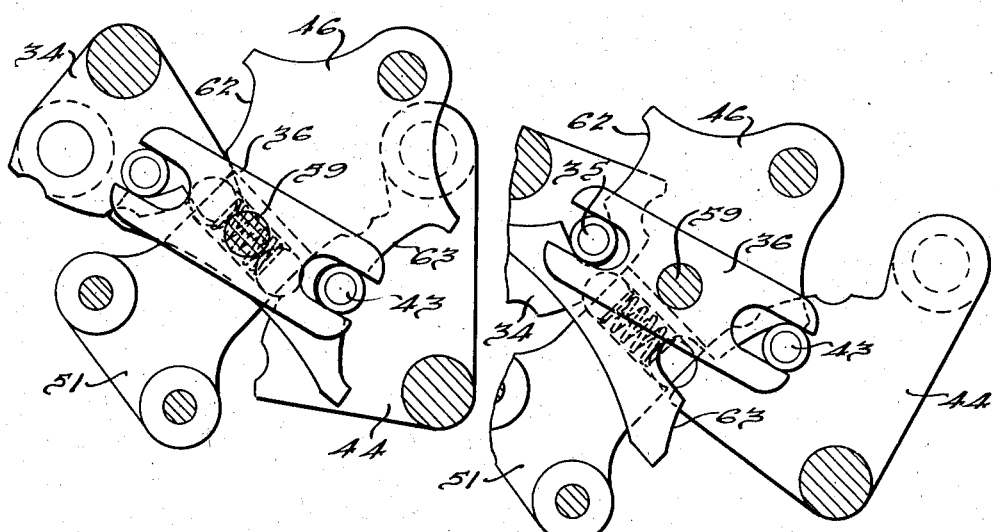

It will be noted that the pivot 59 of crank 56 engages the floating lever 36 at the center thereof, or approximately so. The direction of swinging of the lever 36 will therefore depend upon the direction of swinging of the crank and the position of the lock lever 46. If the lock lever is engaged with the pin 35, counterclockwise swinging of the crank pivot 59 will cause clockwise swinging of the lever 36 about the pin 35 to thereby effect low speed ratio setting as aforesaid and as illustrated in Fig. 9. Clockwise swinging of the crank pivot 59 under the same conditions will effect reverse setting as illustrated in Fig. 12, the lever 36 having been swung counterclockwise about the pin 35 to engage gear 21 with gear 31.

Likewise, with the lock lever 46 engaged with the pin 43, clockwise swinging of the crank pivot 59 will swing the lever 36 clockwise about the pin 43, as shown in Fig. 10, to engage the sleeve 23 with the teeth 27 to effect second speed ratio drive setting; and counterclockwise swinging of the pivot 59 (Fig. 11) will cause counterclockwise swinging of the lever 36 about the pin 43 to engage the sleeve 23 with teeth 26 thereby effecting direct drive setting.

The mechanism is preferably so arranged that rocking of the lever 65 upwardly of the steering column 66 will, through the intermediary of the Bowden cable 71 and the lever 61, swing the lock lever 46 into engagement with the pin 35. This action locks the yoke 32 and its associated mechanism against movement and releases the pin 43 for rolling along the arcuate surface 63. Either low or reverse speed may then be obtained by swinging lever 65 rearwardly or forwardly respectively about the axis of the rod 69'.

Similarly, rocking of the lever 65 downwardly will swing lock lever 46 out of engagement with pin 35 and into engagement with pin 43, thus locking yoke 33 against movement and freeing yoke 32. Forward swinging of lever 65 will then swing lever 60 in a clockwise direction and lever 36 will correspondingly be swung about pin 43 to swing lug 34 upwardly about axle 37 and establish second speed. Rearward swinging of lever 65 will establish direct drive by swinging lug 34 downwardly as will be understood.

The detent balls 53 engage the corresponding arcuate depressions 55 as the lugs 34 and 44 are swung in a manner common in the art. It will be seen that I have provided an easily operated and fool-proof shift mechanism which incorporates a positive interlock making it impossible for one of the shift yokes to be moved unless the other is in neutral position and which, in addition, locks the inactive yoke against unintentional movement at all times.

I claim:

1. In a change speed power transmission, a pair of members adapted for shifting to establish different speed ratio drives; a pair of pivotally mounted shift yokes engaging said members and adapted for swinging about their pivots to shift the members; a pivotally mounted selector lever adapted for swinging about its pivot into locking engagement with said yokes; a floating shift lever pivotally engaging said yokes, and means pivotally engaging said floating lever adapted for operation to swing said lever about a pivot on the locked yoke.

2. In a change speed power transmission, a pair of members adapted for shifting to establish different speed ratio drives; a pair of pivotally mounted shift yokes engaging said members and adapted for swinging about their pivots to shift the members; a pivotally mounted selector lever adapted for swinging about its pivot into locking engagement with said yokes; a floating shift lever pivotally engaging said yokes, and means pivotally engaging said floating lever at substantially the center thereof adapted for operation to swing said lever about a pivot on the locked yoke.

3. In a change speed power transmission, a pair of members adapted for shifting to establish different speed ratio drives; a casing; a pair of yokes journalled in said casing having portions engaging said members; means for swinging said yokes thereby to shift said members including a floating lever pivotally engaged with said yokes and thrust means engaging said lever; and means for selectively locking said yokes against swinging comprising a selector element journalled in said casing for swinging movement into locking engagement with said yokes.

4. In a change speed power transmission, a pair of members adapted for shifting to establish different speed ratio drives; a casing mounting said members; a removable cover for said casing; a pair of shift yokes journalled in said cover having portions extending into engagement with said members; means for swinging said yokes thereby to shift said members including a floating lever pivotally engaging said yokes and thrust means engaging said lever; and means for selectively locking said yokes against swinging comprising a selector element journalled in said cover, all of said levers, yokes and elements being removable from said casing as a unit with said cover.

5. In a power transmission having members adapted for shifting to establish different speed ratio drives, a casing for said members; a pair of shift yokes pivotally mounted in said casing having fork portions offset from the pivots thereof disposed in operative engagement with said members; said yokes also having lug portions extending toward each other and provided with depressions adapted to receive a detent member; a detent mechanism mounted between said lug portions having yieldable members disposed in selective engagement with said depressions; a floating shift lever disposed in pivotal engagement with said respective lug portions, and means for selectively locking said yokes against swinging about said pivots.

6. In a power transmission having members adapted for shifting to establish different speed ratio drives, a casing for said members; a pair of shift yokes pivotally mounted in said casing on parallel axes, said yokes having portions operatively engaging said members and flat portions disposed in a common plane; detent means disposed in said plane between said flat portions and operatively engaging the same; a floating shift lever disposed in a plane parallel to the aforesaid plane and operatively engaging said yokes; and a crank operably engaging said floating lever, said crank being adapted for swinging in a plane parallel to the aforesaid planes.

7. In a power transmission having members adapted for shifting to establish different speed ratio drives, a casing for said members; a pair of shift yokes pivotally mounted in said casing on parallel axes, said yokes having portions operatively engaging said members and flat portions disposed in a common plane; detent means disposed in said plane between said flat portions and operatively engaging the same; a floating shift lever disposed in a plane parallel to the aforesaid plane and operatively engaging said yokes; a selector element disposed between said flat portions and said floating lever for swinging in a plane parallel thereto into locking engagement with either of said yokes, and a crank operably engaging said floating lever, said crank being adapted for swinging in a plane parallel to the aforesaid planes.

OTTO E. FISHBURN.